Dec. 27, 1932.  A. O. WILLIAMS  1,892,121
TRAILER
Filed Jan. 17, 1930  2 Sheets-Sheet 1

Inventor
Alfred O. Williams
By Brown, Jackson, Boettcher & Dienner
Attys

Dec. 27, 1932.  A. O. WILLIAMS  1,892,121
TRAILER
Filed Jan. 17, 1930   2 Sheets-Sheet 2

Inventor:
Alfred O. Williams.
By Brown, Jackson, Boettcher & Dienner
Attys.

Patented Dec. 27, 1932

1,892,121

UNITED STATES PATENT OFFICE

ALFRED O. WILLIAMS, OF BATTLE CREEK, MICHIGAN, ASSIGNOR TO CLARK TRUC-TRACTOR COMPANY, OF BUCHANAN, MICHIGAN, A CORPORATION OF MICHIGAN

TRAILER

Application filed January 17, 1930. Serial No. 421,350.

My invention relates to trucks of the trailer type and has for its principal object the production of a new and improved truck of this type which is light in weight, and which is cross braced to enable it to withstand the shocks to which a truck of this kind is subjected.

Trailer trucks comprising flat platforms which are supported on low wheels mounted beneath them, and provided with coupling devices enabling them to be attached to a shop tractor, are in common usage in warehouses, manufacturing plants, and the like. Generally these trucks are provided with a pair of main wheels and a pair of caster wheels, this combination permitting easy manipulation of the truck around through the shop in which it is to be used.

Coupling devices are usually provided at both ends of the truck platform so that a series of the trucks may be hitched on behind a tractor and the entire train of trucks moves thereby.

Trucks of this kind devised heretofore have been subject to the criticism of a lack of cross bracing, which permits the truck to be easily knocked out of shape so that it will not follow truly behind the tractor, and therefore greater tractive effort is required to move the truck. In my present invention I have provided a new and improved construction which adequately braces the truck against stresses imposed diagonally of its platform as well as against stresses imposed longitudinally and transversely of the platform, so that the truck is well able to withstand the shocks imposed upon it in every day usage to which it may be put.

My improved construction permits building the platform as a unit which is entirely self-supporting, and permits building the wheel assemblies as separate units which may be attached to the platform unit without the use of special tools. This arrangement saves considerable space in the manufacturing plant since the platform can be completely assembled and carried in stock without occupying an excessively large amount of space, and the wheel assemblies can likewise be completed and stocked. The truck may be shipped to its destination in a knock down condition and there assembled by an ordinary workman without the use of special or complicated tools.

Now, to acquaint those skilled in the art with the teachings of my invention, reference is made to the accompanying drawings in which a preferred embodiment of it is shown by way of example and in which—

Figure 1 is a plan view of a completely assembled truck platform;

Figure 2 is a cross-sectional elevational view of Figure 1 taken along the line 2—2 of Figure 1;

Figure 3:
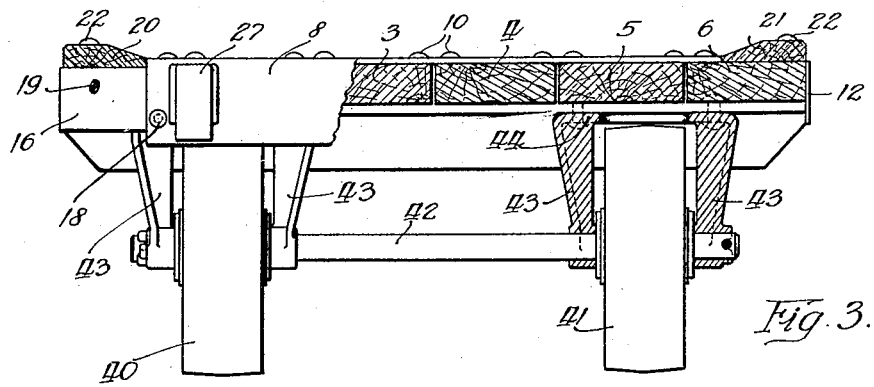
Figure 3 is an end view, partly in section, of a completely assembled truck.
Figure 4:
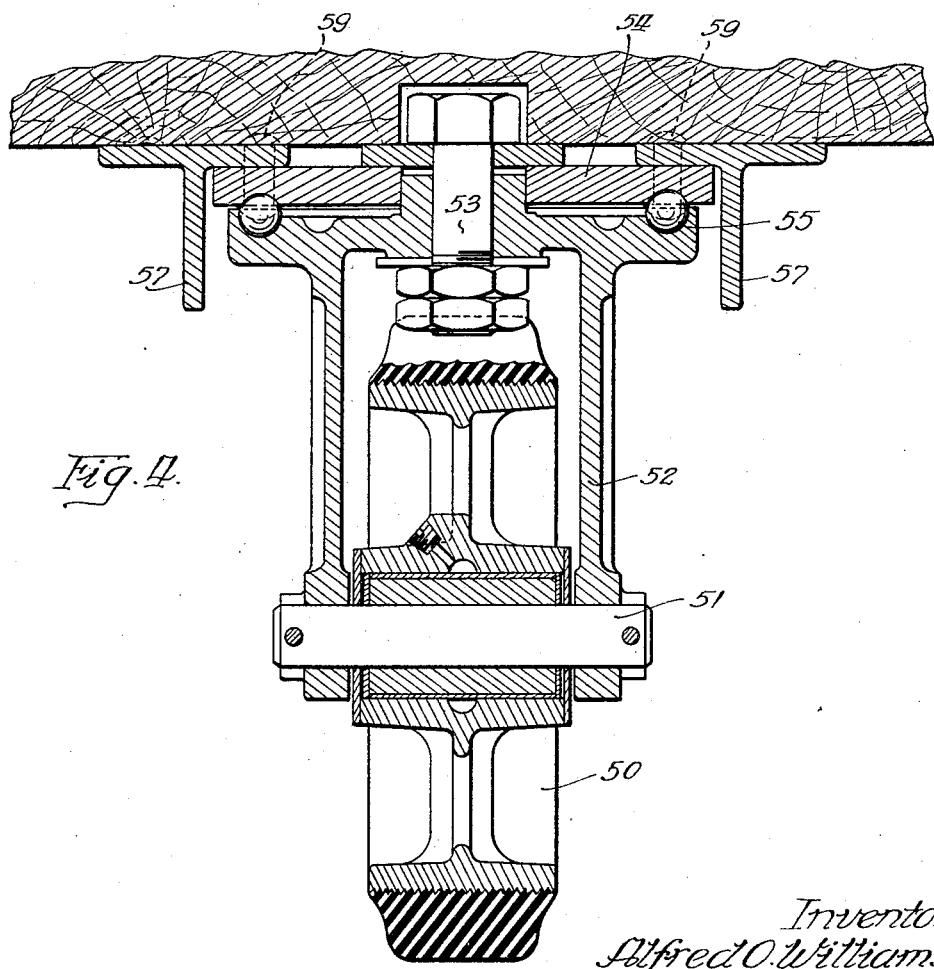
Figure 4 is a cross-sectional view through one of the caster wheels of the truck taken along the line 4—4 of Figure 2.

Referring to the drawings now in more detail the truck platform comprises a plurality of hardwood boards 1, 2, 3, 4, 5 and 6 which are laid longitudinally to form a rectangular platform 7. The length, width, and thickness of these boards will of course be varied to meet the size requirements of the particular truck in question, and in one specific embodiment of my invention the boards are hardwood boards 2 inches thick, 6 inches wide, and 6 feet long.

Across the opposite ends of the boards 1 to 6, inclusive, are placed angle irons 8 and 9 which are laid with one of their flanges above the upper surface of the boards and the other flange projecting downward over the ends of the boards.

The boards are attached to these angle irons by any convenient means such as the bolts 10 to hold the six boards 1 to 6, inclusive, together as a unit.

The corners of the outer boards 1 and 6 are cut away as is shown at 11 to better enable the platform to clear itself of an obstruction against which it may strike. The edges of the board 6 are protected by a metallic batter plate 12 which is fitted at one end under the angle iron 9 and held therein by the bolt screw 13 projected through the end of the angle iron and the end of the batter plate 12. The plate covers the entire exposed edge of the board 6 and its opposite end is similarly fitted under the angle iron 8 and held therein by the bolt 14. The intermediate portion of the batter plate 12 is attached to the board 6 in any preferred manner as by the wood screws 15 to securely hold it in place.

Similarly the exposed edge of the board 1 is protected by a batter plate 16 the one end of which is fitted under the angle iron 9 and held therein by the bolt 17, and the opposite end similarly fastened under the angle iron 8 by the bolt 18, with the intermediate portion attached to the board 1 by the wood screws 19 to securely hold it in place.

Wedge shape wooden members 20 and 21 are attached to the boards 1 and 6, respectively, along the outer edges of the platform in any suitable manner as by the through bolts 22, these wedges serving to tip articles placed on the platform inward towards the center of the truck to thereby prevent them from falling off of the platform when the truck is being moved. In certain instances it may also be desirable to provide stakes on the sides and ends of the truck to better hold the merchandise on it, and to provide for this I have provided stake pockets 24 which are bolted to the outer boards of the platform by bolts 25 and which contain a pocket-like receptacle 26 into which a suitable stake may be placed. The number of stake pockets employed may be varied to meet particular conditions, and in the preferred embodiment shown, four such pockets are provided, that is, two on each side of the platform. End stake pockets 27 are provided and attached to opposite ends of the cross angle irons 8 and 9 in any convenient manner such as by welding, these pockets preferably comprising a cup-like member having a suitable opening 28 and into which an end stake may be inserted.

The platform is completed by the addition of coupling members 30 and 31 which may be any preferred form of coupler, those shown in Figure 1 by way of example being a coupler of the type shown and described in the copending application of Walter C. Yeakle, Serial No. 393,981, filed September 20, 1929. The coupler 30 comprises a ring-like member, and the coupler 31 a hook-like member which is adapted to engage the ring 30 of another truck or of a tractor to thereby establish a driving connection between these two devices.

The wheels upon which the platform unit is supported may conveniently be a pair of main wheels 40 and 41 which are supported on an axle 42 disposed transversely of the platform and supported thereon by brackets 43 which have an upper flanged portion 44 which is fastened to the cross bars 45 and 46. These cross bars may conveniently be T-bars as shown in the drawings, disposed with a horizontal flange against the under surface of the planks 1-6 inclusive and bolted thereto by through bolts 47. Preferably the brackets 43 are attached to the T-bars 45 and 46 by rivets 48, although any other suitable form of attaching these parts may be employed within the teachings of my invention.

The wheel unit thus formed is a unitary structure which may be detached from the platform of the truck by removal of the bolts 47 and shipped or stocked separately from the platform. The overall height from the floor to the top of the wheel unit is sufficiently small so that when the platform is mounted on top of the unit its upper surface is reasonably close to the floor to thereby facilitate easy loading and unloading of the truck.

The truck is also provided with a caster wheel unit which is similarly constructed and comprises caster wheel 50 which is mounted on axle 51 which is supported in the caster bracket 52, that bracket being pivoted to swing about the vertical axis 53 to cause the caster wheel to align itself with the direction of travel of the truck.

The upper end of the caster bracket is supported on a stationary plate 54 by the antifriction bearing comprising ball bearings 55 running in suitable races in the caster bracket and the stationary bracket. The stationary bracket, which is of generally rectangular shape is attached at its four corners to a pair of T-bars 57 by any suitable means such as the rivets 59. The caster wheel 50 and a second similar wheel, not shown, together with the T-bars 57 form the caster wheel unit which is complete in itself and which may be attached to the truck platform by any preferred means such as the bolts 58.

It will be observed that the bolts 47 and 58 which attach the wheel units to the platform are projected through each and every board of the platform, thereby securely binding those boards to the cross braces 45, 46 and 57 which braces add materially to the resistance of the platform to diagonal and longitudinal stresses such as are likely to be encountered in the every day use of a truck of this kind. The truck so constructed is thereby strengthened and better enabled to withstand the rough usage imposed upon it.

The platform boards 1-6 inclusive project beyond the wheel units at each end of the truck, and since the boards are disposed longitudinally of the platform, they are sufficiently strong to resist a bending down of the ends of the truck when it is heavily loaded. This arrangement permits me to use a frame structure which is devoid of strong side channels and therefore lighter and cheaper than the frames of the prior art in platforms that are provided with transversely disposed boards.

The truck constructed in accordance with the teachings of my invention is ruggedly built and at the same time is sufficiently light to permit it to be conveniently handled in the shop. It may be shipped and stored in a knock down condition thereby reducing the freight cost and handling charge which must be assessed against the truck.

While I have shown my invention by illustrating and describing a truck of the trailer type, obviously the principles of the invention are not limited to trucks of this type and by suitable modifications that can be made by one skilled in the art within the teachings of the invention, the invention may be applied to a variety of trucks, and I am not therefore to be limited except by the scope of the appended claims.

What is claimed is:—

1. A truck comprising a plurality of boards which together form a substantially rectangular platform, a plurality of metallic braces disposed under said platform transversely of said boards and platform, batter plates attached to the edges of said platform, an angle iron disposed at each end of the platform with one of its legs laid over the upper surface of said boards and the other leg extended downward over the ends of the boards and over said batter plates, bolts projected through said boards and angle irons to hold the latter in place, a coupler attached to each angle iron at the center of the end of the platform, a stake pocket attached to each end of each angle iron, and wheels mounted below said platform.

2. A truck comprising a plurality of boards which together form a substantially rectangular platform, a plurality of cross braces disposed under said platform transversely of said boards and platform, batter plates attached to the sides of said platform, wooden wedge strips attached to the outer ones of said boards longitudinally of said platform and secured to the cross braces, angle irons attached transversely of the platform to the ends of said boards at the end and upper surfaces thereof between said wedges and to the batter plates, and wheels mounted beneath the platform.

3. A truck comprising a plurality of boards which together form a substantially rectangular platform, said boards extending longitudinally of the platform, a plurality of metallic T-bars detachably secured directly to the boards and disposed under and transversely of the boards and platform, batter plates attached to the side edges of said platform, an angle iron disposed at each end of the platform transversely thereof and of the boards with one of its legs laid over the upper surface of said boards and the other leg extended downward over the ends of the boards and over said batter plates, bolts projected through said boards and angle irons to hold the two together, wedge strips attached on top of the outer ones of said boards longitudinally of the platform, said angle irons extending between said wedge strips and being secured to the batter plates, stake pockets on the sides and ends of the platform adapted to receive stakes, a wheel unit consisting of a pair of wheels on an axle which is supported by triangular brackets having the bases thereof riveted to the horizontal flanges of a first pair of said T-bars, a caster unit consisting of a pair of caster wheels each supported by a caster bracket the stationary member of which is riveted to the horizontal flanges of a second pair of said T-bars, and means including bolts engaging said boards and T-bars for detachably holding said units thereunder, said two pairs of T-bars being parallel to each other.

In witness whereof, I hereunto subscribe my name this 14th day of January, 1930.

ALFRED O. WILLIAMS.